US012613443B2

(12) United States Patent
Lin

(10) Patent No.: US 12,613,443 B2
(45) Date of Patent: Apr. 28, 2026

(54) DISPLAY DEVICE

(71) Applicant: AUO Corporation, Hsinchu (TW)

(72) Inventor: Yi-Ling Lin, Hsinchu (TW)

(73) Assignee: AUO Corporation, Hsinchu City (TW)

( * ) Notice: Subject to any disclaimer, the term of this patent is extended or adjusted under 35 U.S.C. 154(b) by 213 days.

(21) Appl. No.: 18/399,738

(22) Filed: Dec. 29, 2023

(65) Prior Publication Data

US 2025/0216725 A1 Jul. 3, 2025

(30) Foreign Application Priority Data

Dec. 27, 2023 (TW) ................................ 112150997

(51) Int. Cl.
*G02F 1/1337* (2006.01)

(52) U.S. Cl.
CPC ...... *G02F 1/133776* (2021.01); *G02F 1/1337* (2013.01); *G02F 1/133707* (2013.01); *G02F 1/133746* (2021.01)

(58) Field of Classification Search
CPC ......... G02F 1/133776; G02F 1/133707; G02F 1/133746
See application file for complete search history.

(56) References Cited

U.S. PATENT DOCUMENTS

| | | | | |
|---|---|---|---|---|
| 2006/0215085 | A1 | 9/2006 | Wang et al. | |
| 2008/0303997 | A1 * | 12/2008 | Takeda | G02F 1/1393 349/129 |
| 2013/0229607 | A1 * | 9/2013 | Seong | G02F 1/134336 264/1.36 |
| 2016/0282672 | A1 * | 9/2016 | Lim | G02F 1/133711 |
| 2018/0046034 | A1 * | 2/2018 | Lim | C09K 19/3444 |
| 2022/0146891 | A1 | 5/2022 | Sato et al. | |
| 2023/0333430 | A1 | 10/2023 | Lin | |

FOREIGN PATENT DOCUMENTS

| | | |
|---|---|---|
| TW | 200519454 | 6/2005 |
| TW | 200634372 | 10/2006 |

* cited by examiner

*Primary Examiner* — Jia X Pan
(74) *Attorney, Agent, or Firm* — JCIPRNET

(57) ABSTRACT

A display device includes a first substrate, a plurality of first protrusions, a first alignment layer, a second substrate, a second alignment layer, and a display medium. The first alignment layer is disposed on the first substrate. The second substrate is disposed opposite to the first substrate. The first protrusions are disposed on the second substrate and are separated from each other. The second alignment layer is disposed on the second substrate and the first protrusions. The first alignment layer and the second alignment layer are located between the first substrate and the second substrate. The display medium is located between the first alignment layer and the second alignment layer, where a surface of the first alignment layer and a surface of the second alignment layer facing the display medium have topographies with irregular areas surrounded by micro-structures.

9 Claims, 13 Drawing Sheets

DISPLAY DEVICE

CROSS-REFERENCE TO RELATED APPLICATION

This application claims the priority benefit of Taiwan application serial no. 112150997, filed on Dec. 27, 2023. The entirety of the above-mentioned patent application is hereby incorporated by reference herein and made a part of this specification.

BACKGROUND

Technical Field

The disclosure relates to a photoelectric device; more particularly, the disclosure relates to a display device.

Description of Related Art

A reflective liquid crystal display has attracted market attention due to its advantages of saving energy and environmental protection. Bistable characteristics of liquid crystal (LC) molecules allow ambient light to be reflected by or pass through the display, which leads to a bright or dark ambient to achieve the purpose of display. Therefore, it is not required to additionally set a backlight source.

However, in the dark state, the existing reflective liquid crystal display may display a whitish color with a high haze level, thus resulting in poor display quality. In addition, the response time of the existing reflective liquid crystal display is excessively long, and thus it is unlikely to achieve active driving.

SUMMARY

The disclosure provides a display device with favorable performance.

An embodiment of the disclosure provides a display device that includes a first substrate, a plurality of first protrusions, a first alignment layer, a second substrate, a second alignment layer, and a display medium. The first alignment layer is disposed on the first substrate. The second substrate is disposed opposite to the first substrate. The first protrusions are disposed on the second substrate and separated from each other. The second alignment layer is disposed on the second substrate and the first protrusions. The first alignment layer and the second alignment layer are located between the first substrate and the second substrate. The display medium is located between the first alignment layer and the second alignment layer. A surface of the first alignment layer and a surface of the second alignment layer facing the display medium have topographies with a plurality of irregular areas surrounded by a plurality of microstructures.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

(deleted.)

Figure 3:
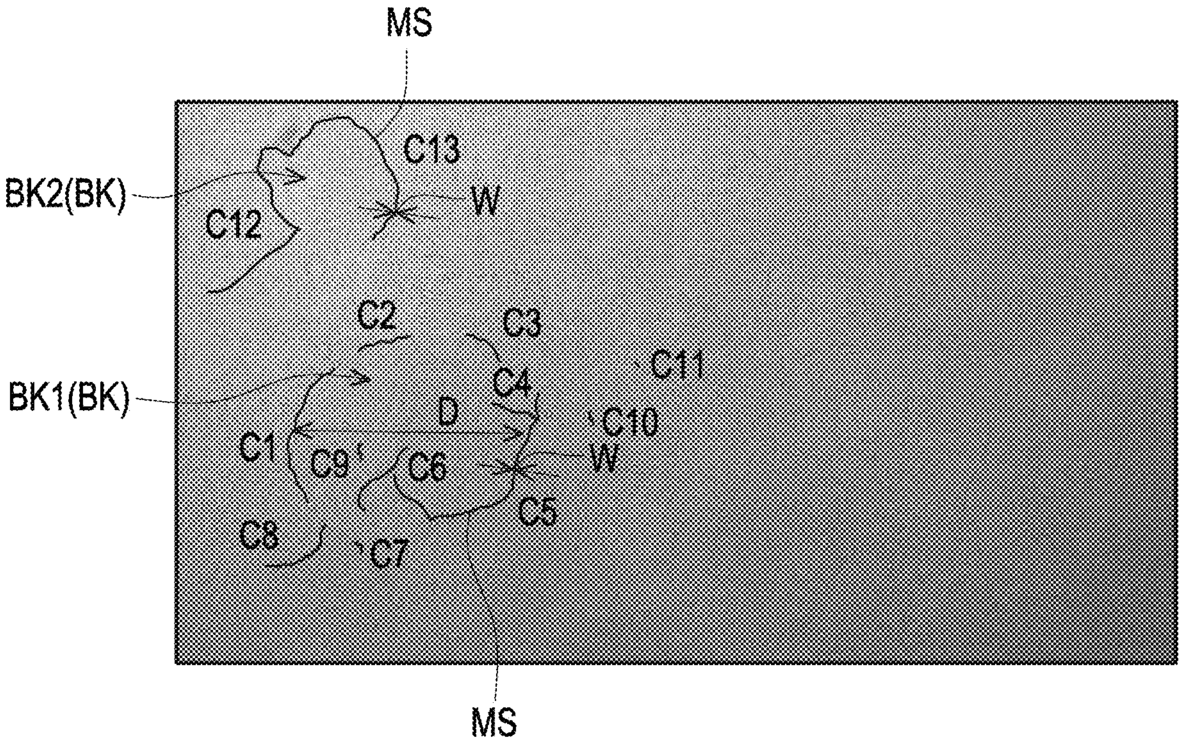

FIG. 3 is a partial enlarged view of a surface of a second alignment layer of a display device according to an embodiment of the disclosure.

Figure 4:
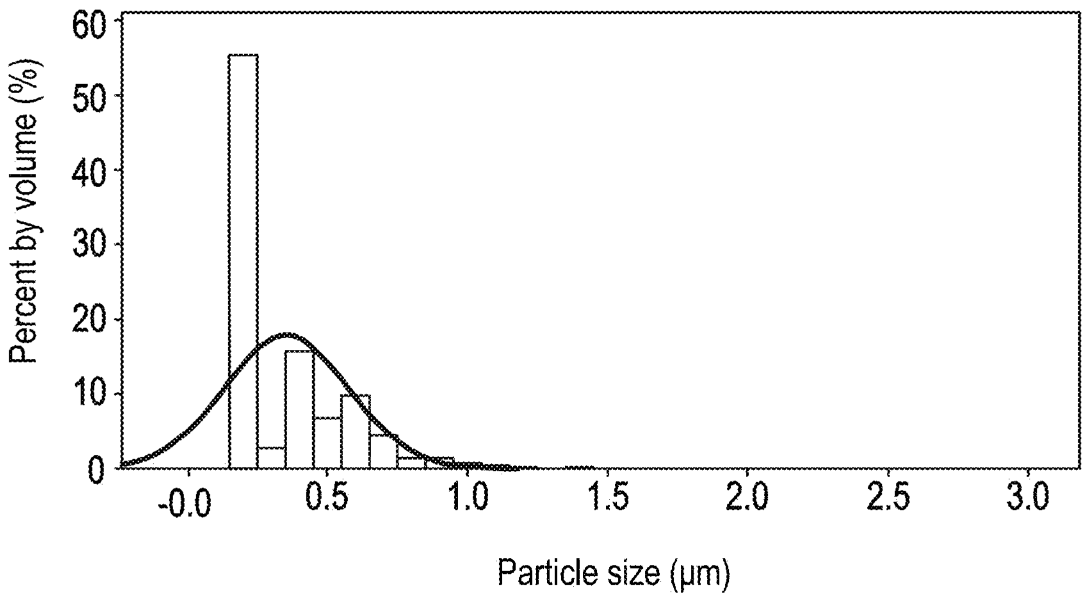

FIG. 4 is a particle size analysis diagram of microstructures according to an embodiment of the disclosure.

Figure 5A:
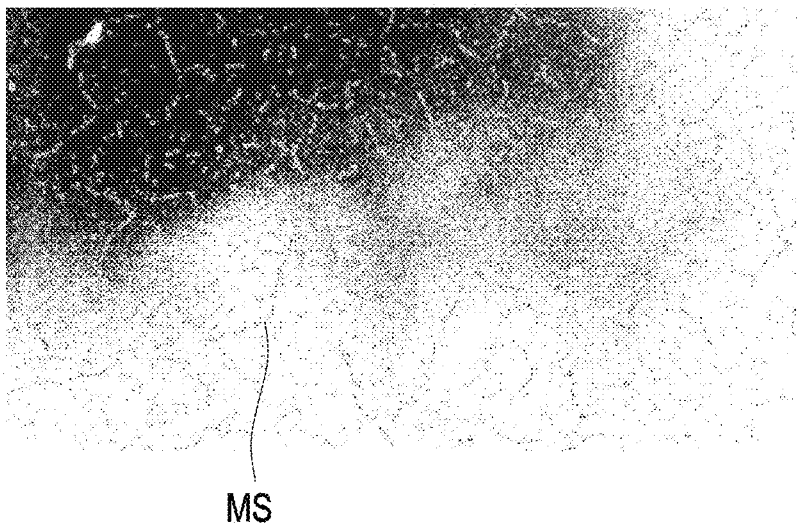

FIG. 5A is a micrograph of a display device in which a display medium is in a homeotropic state according to an embodiment of the disclosure.

Figure 5B:
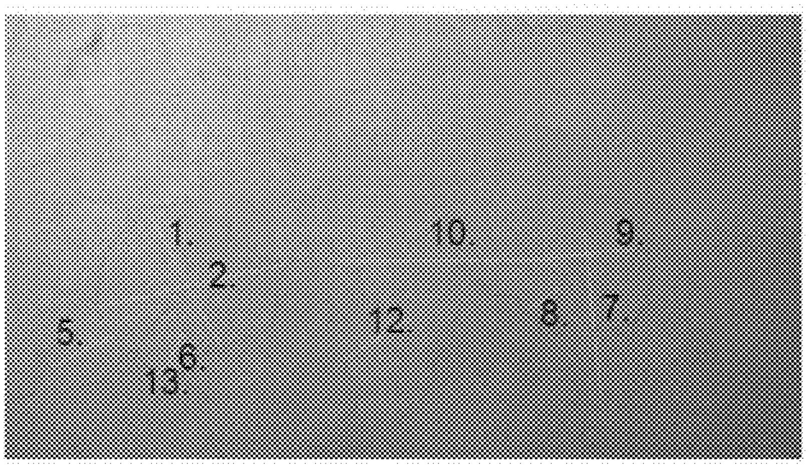

FIG. 5B is a micrograph of a display device in which a display medium is in a planar state according to an embodiment of the disclosure.

Figure 5C:
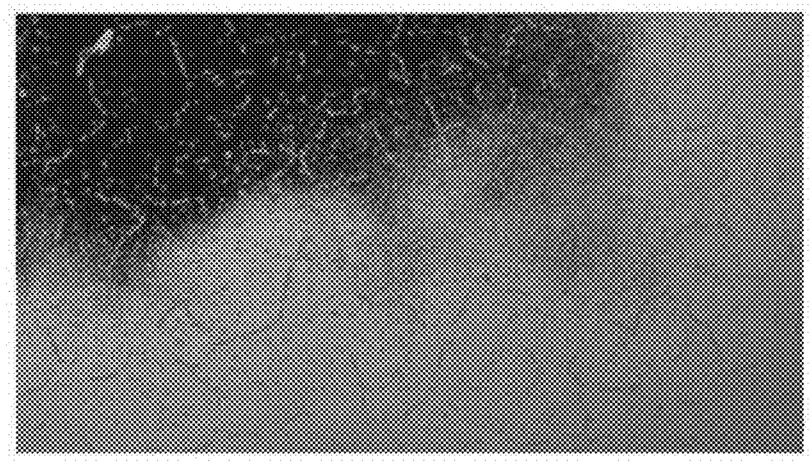
Figure 6A:
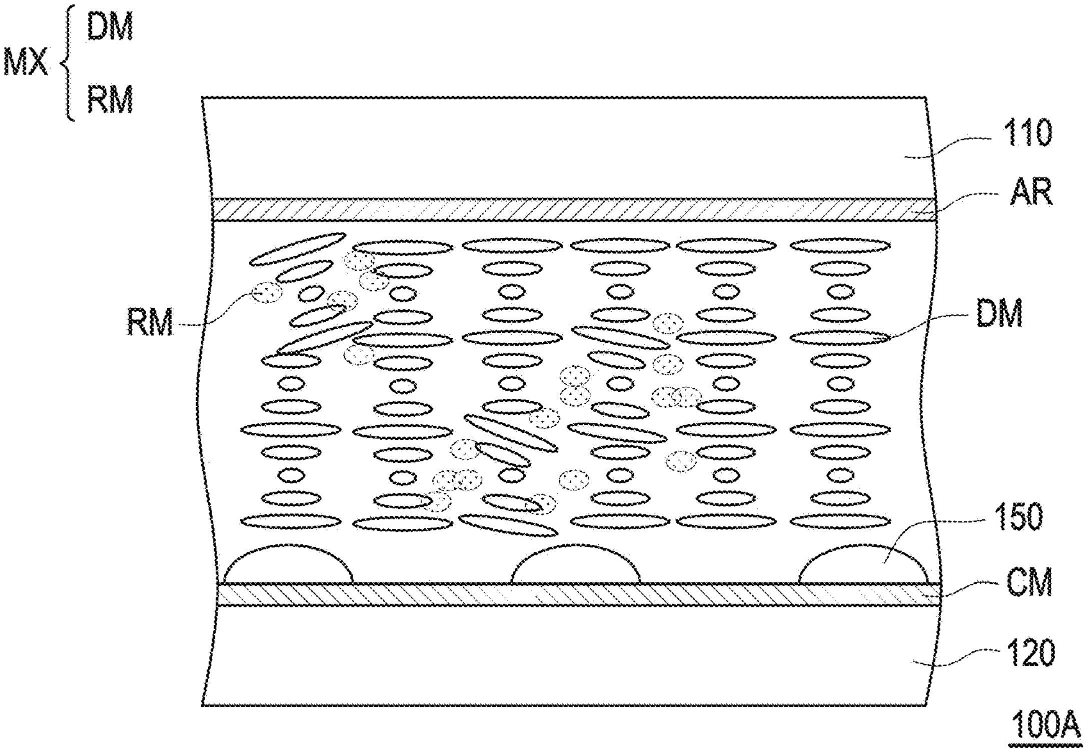
Figure 6B:
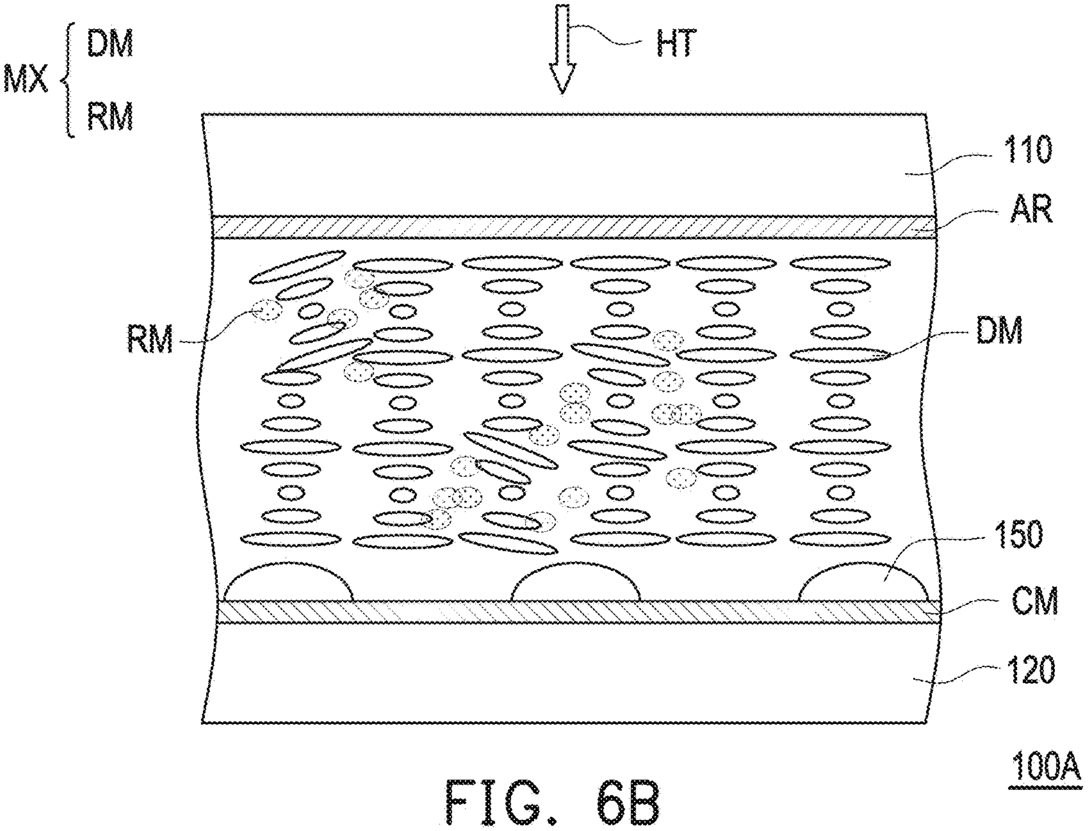

FIG. 5C is an image obtained by overlapping FIG. 6A and FIG. 6B.

Figure 5D:

FIG. 5D is a micrograph of a display device in which a display medium is in a focal conic state according to an embodiment of the disclosure.

Figure 5E:
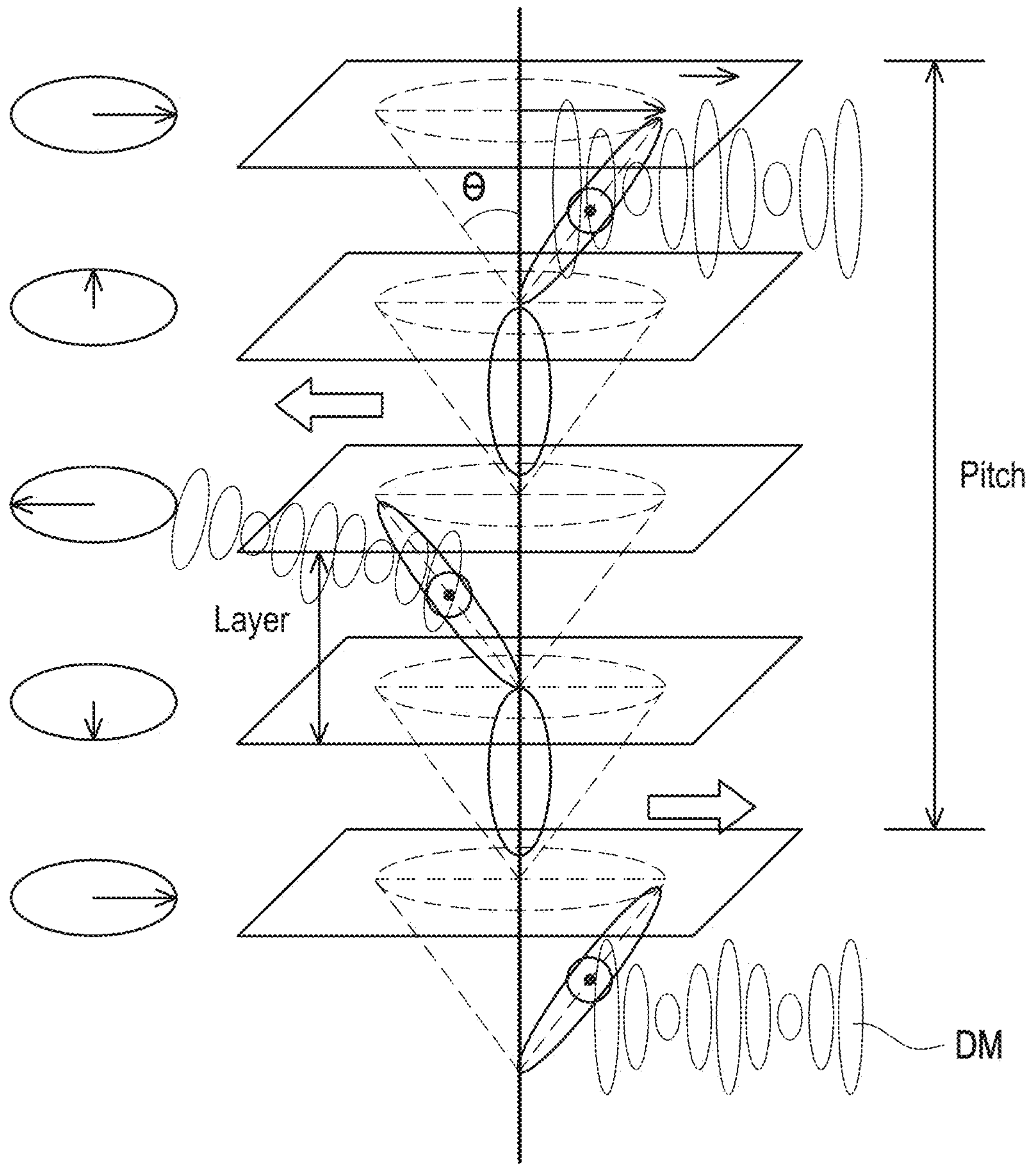

FIG. 5E is a schematic view of arrangement in a display device in which a display medium is in a focal conic state according to an embodiment of the disclosure.

Figure 6C:
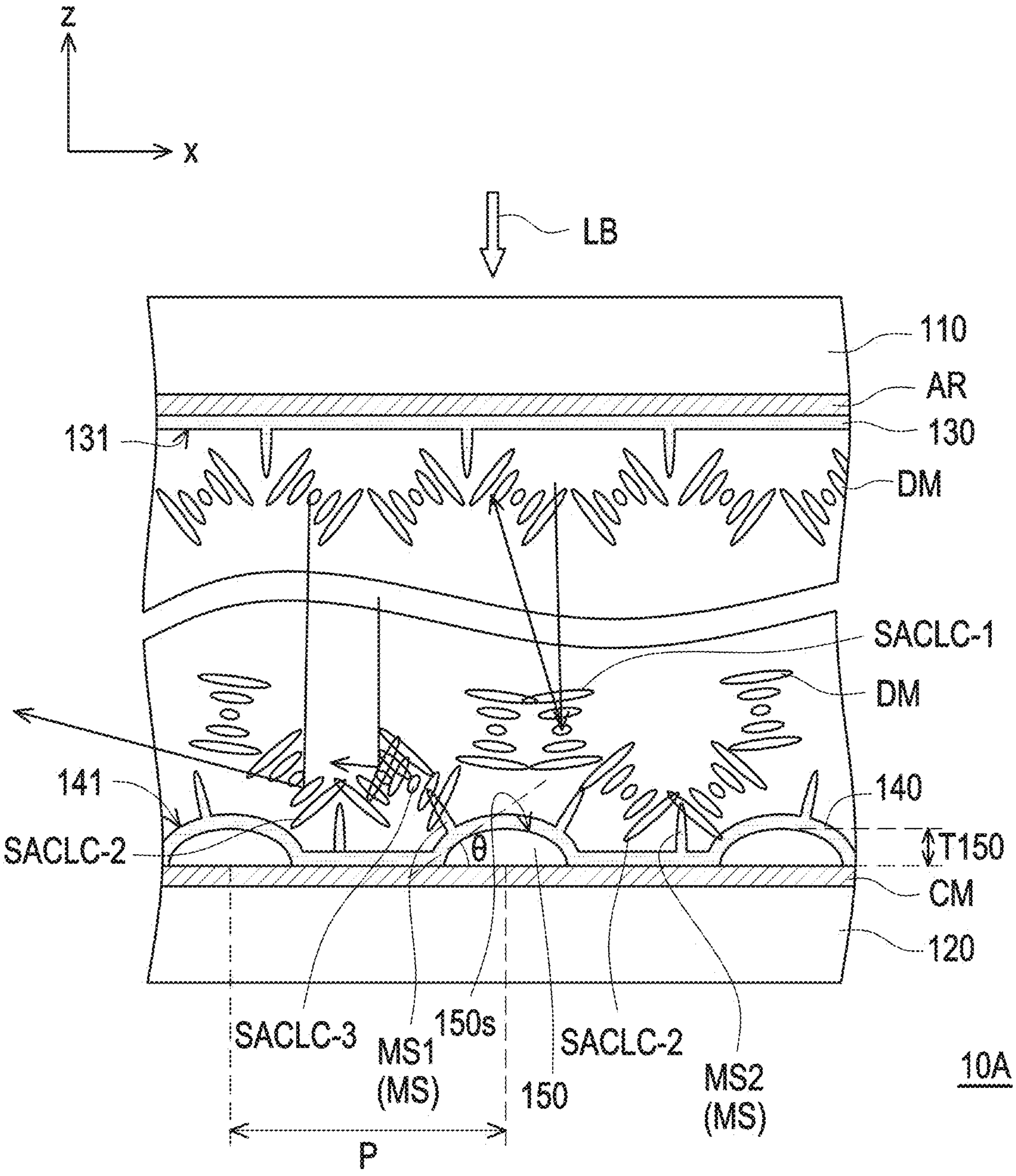

FIG. 6A to FIG. 6C are schematic cross-sectional views of steps in a manufacturing method of a display device according to another embodiment of the disclosure.

Figure 7:
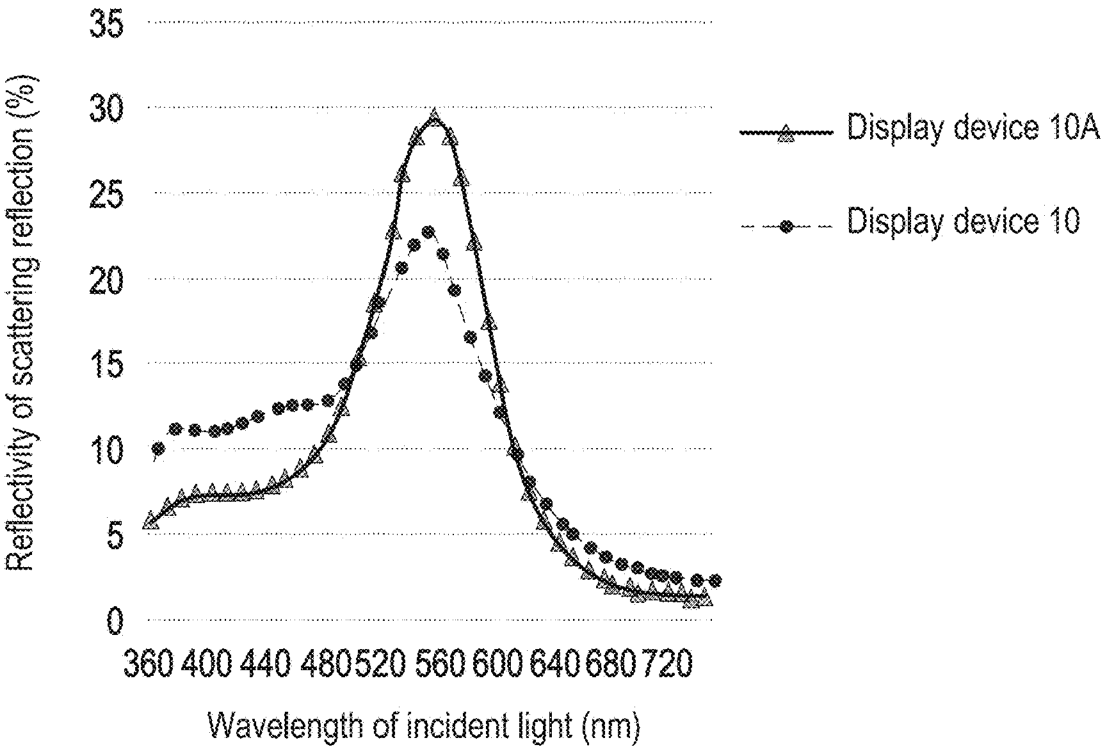

FIG. 7 illustrates a relationship between a wavelength of incident light and a reflectivity of scattering reflection of a display device 10 provided in an embodiment of the disclosure and a relationship between the wavelength of the incident light and a reflectivity of scattering reflection of a display device 10A according to another embodiment of the disclosure.

Figure 8:
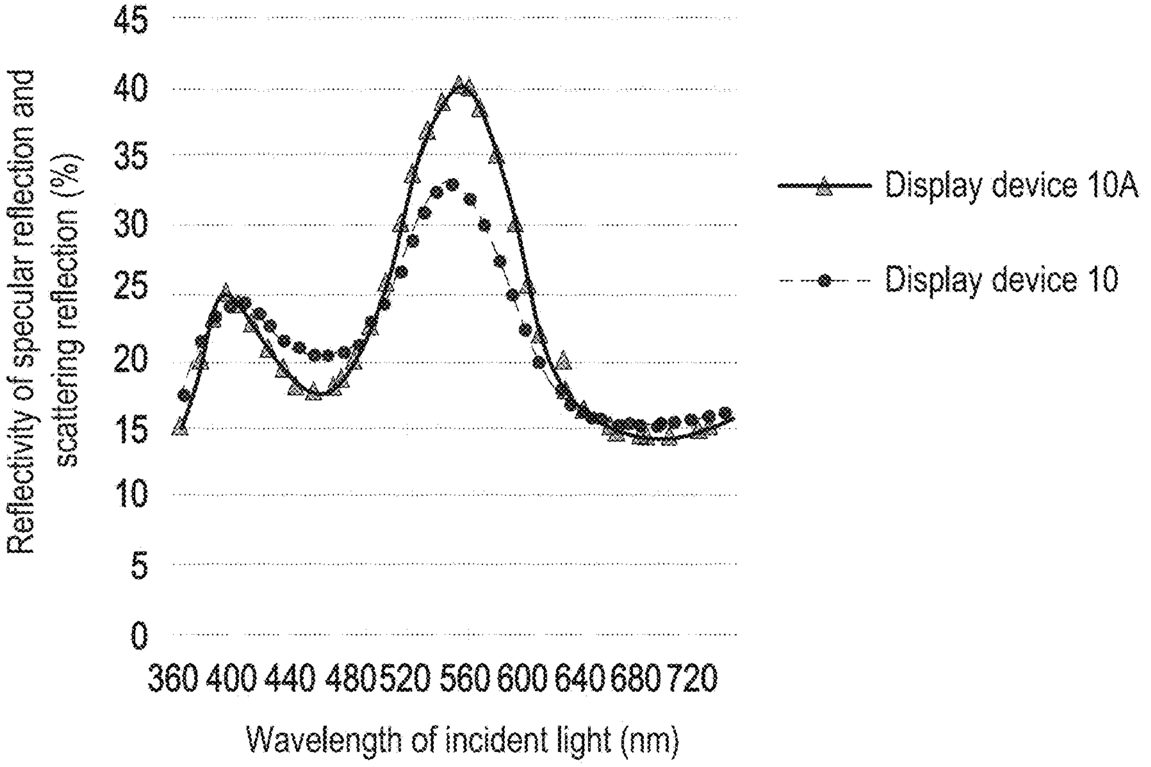

FIG. 8 illustrates a relationship between a wavelength of incident light and a reflectivity of specular reflection and scattering reflection of a display device 10 provided in an embodiment of the disclosure and a relationship between the wavelength of the incident light and a reflectivity of specular reflection and scattering reflection of a display device 10A according to another embodiment of the disclosure.

Figure 9:
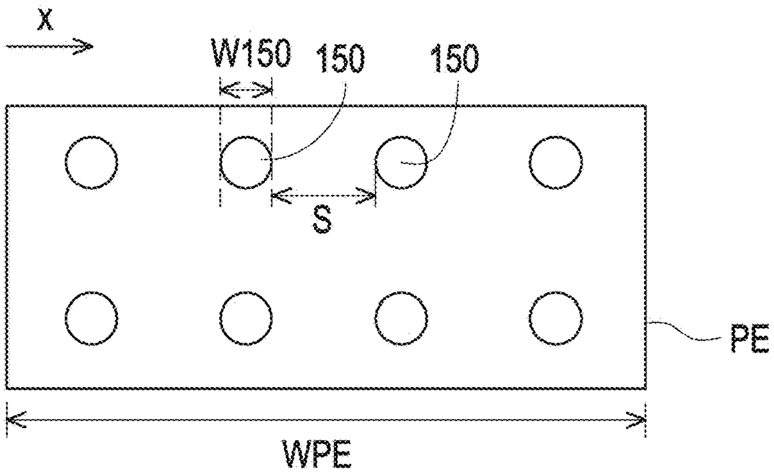

FIG. 9 is a schematic top view of a pixel electrode and a plurality of first protrusions of a display device according to another embodiment of the disclosure.

Figure 10:
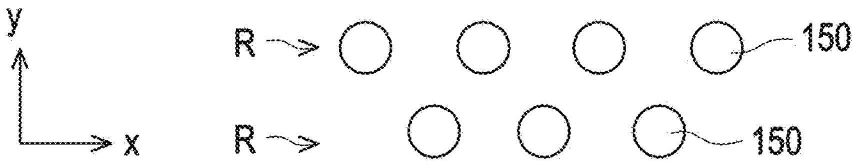

FIG. 10 is a schematic top view of a plurality of first protrusions according to another embodiment of the disclosure.

Figure 11:
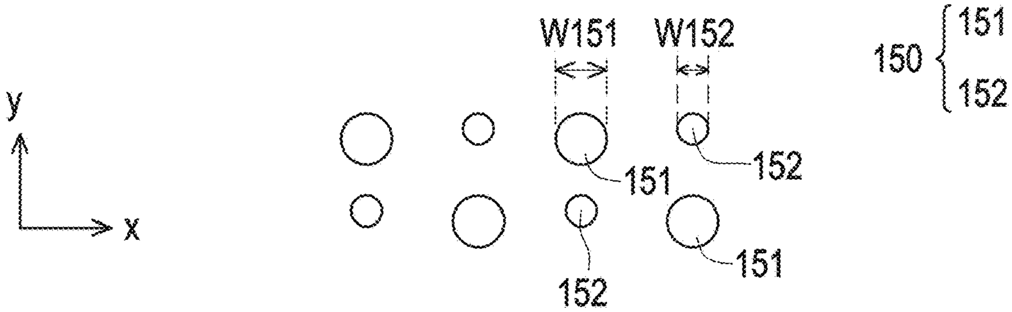

FIG. 11 is a schematic top view of a plurality of first protrusions according to yet another embodiment of the disclosure.

Figure 12:
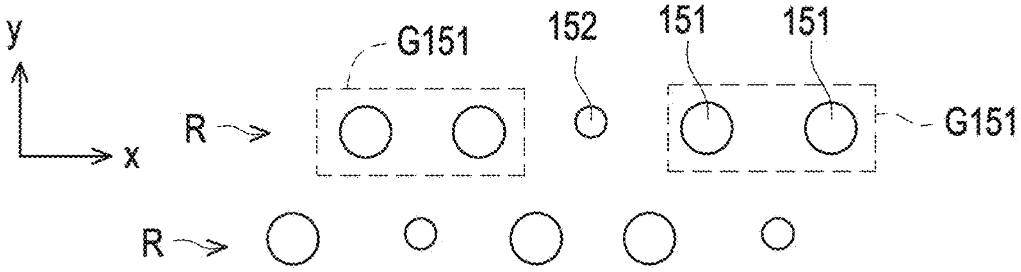

FIG. 12 is a schematic top view of a plurality of first protrusions according to still another embodiment of the disclosure.

Figure 13:
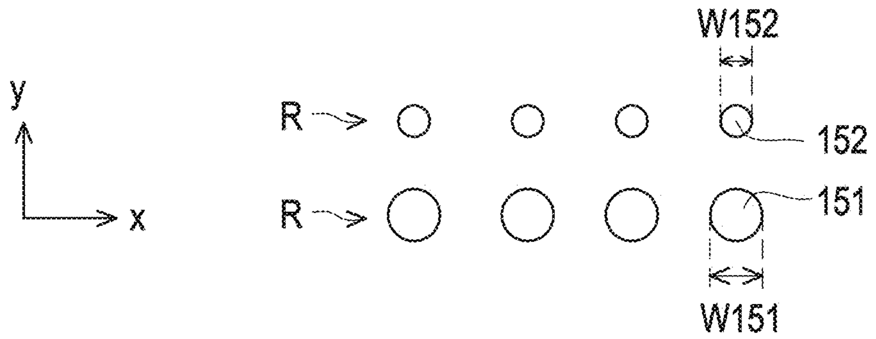

FIG. 13 is a schematic top view of a pixel electrode and a plurality of first protrusions of a display device according to an embodiment of the disclosure.

Figure 14:
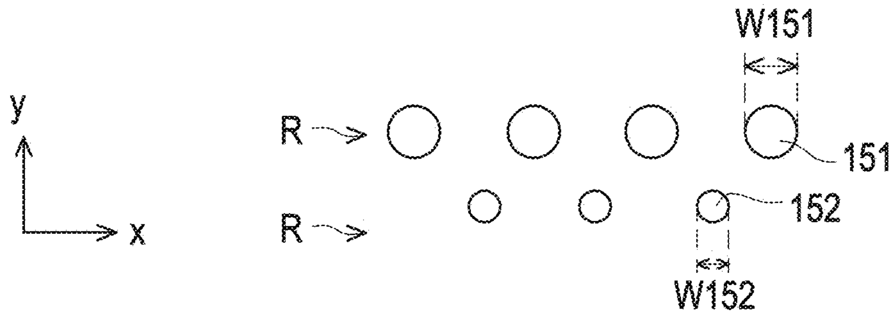

FIG. 14 is a schematic top view of a pixel electrode and a plurality of first protrusions of a display device according to another embodiment of the disclosure.

Figure 15:
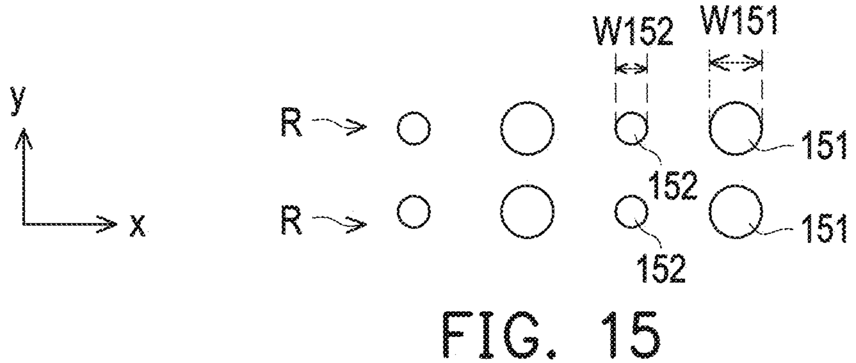

FIG. 15 is a schematic top view of a plurality of first protrusions according to yet another embodiment of the disclosure.

Figure 16:
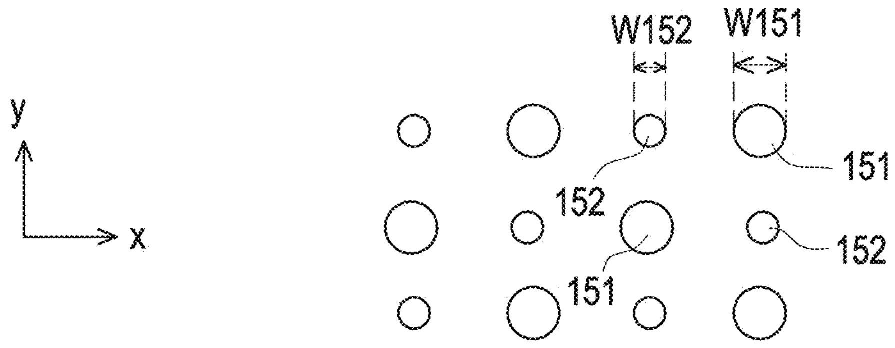

FIG. 16 is a schematic top view of a plurality of first protrusions according to still another embodiment of the disclosure.

Figure 17:
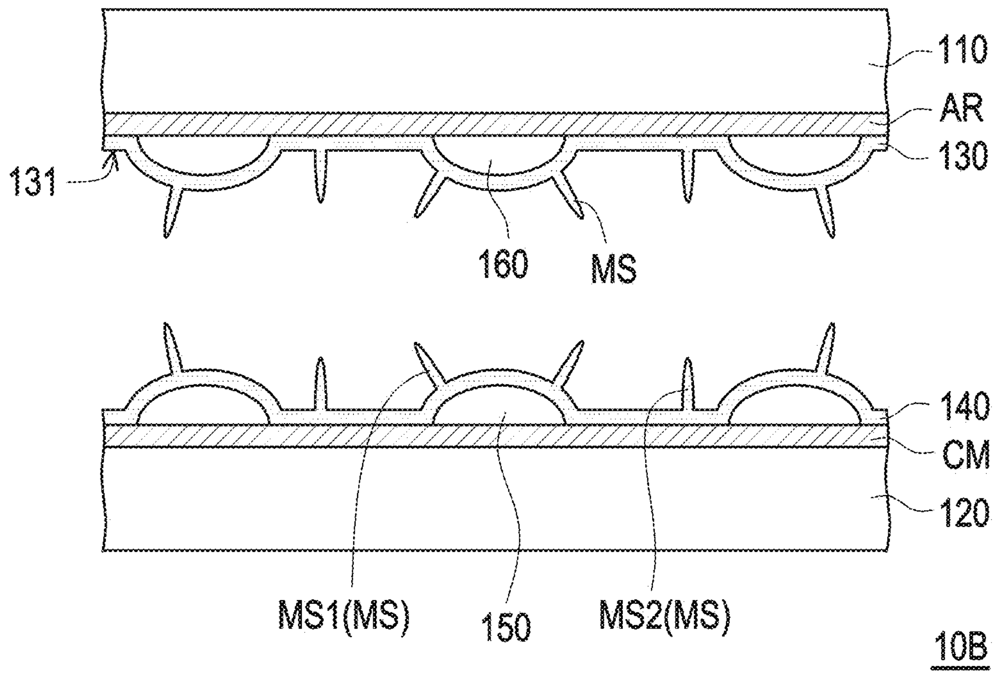

FIG. 17 is a schematic cross-sectional view of a display device according to yet another embodiment of the disclosure.

Figure 18:
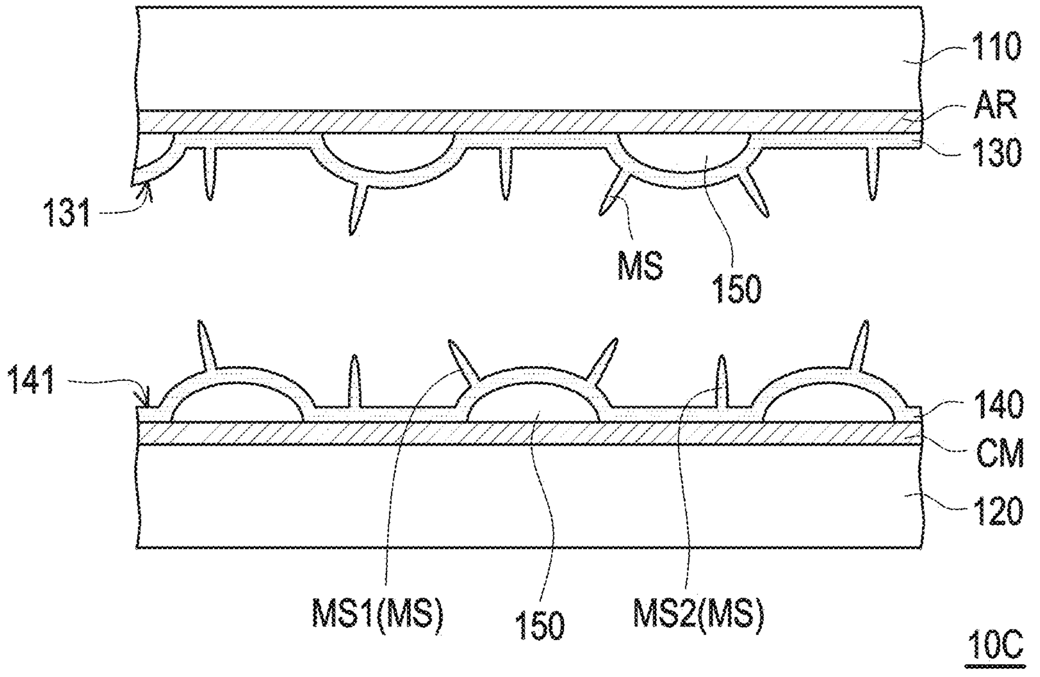

FIG. 18 is a schematic cross-sectional view of a display device according to still another embodiment of the disclosure.

DESCRIPTION OF THE EMBODIMENTS

In the accompanying drawings, the thickness of layers, films, panels, regions, and so forth are enlarged for clarity. The same reference numbers refer to the same elements throughout the specification. It should be understood that when an element, such as a layer, a film, a region, or a substrate is referred to as being "on" or "connected to" another element, it can be directly on or connected to the another element, or an intermediate element may also be present. By contrast, when an element is referred to as being "directly on" or "directly connected to" another element, no intermediate element is present. As used herein, being "connected" may refer to a physical and/or electrical connection. Furthermore, being "electrically connected" or "coupled" may refer to the presence of other elements between the two elements.

It should be understood that, although the terminologies "first," "second," "third," and so forth may serve to describe various elements, components, regions, layers, and/or sections in this disclosure, these elements, components, regions, layers, and/or sections shall not be limited by these terminologies. These terminologies merely serve to distinguish one element, component, region, layer, and/or section from another element, component, region, layer, or section. Thus, a first "element," "component," "region," "layer," or "section" discussed below may be called as a second element, component, region, layer, or section without departing from the teachings herein.

The terminologies used herein are only for the purpose of describing particular embodiments and are not restrictive. As used herein, the singular forms "a," "an," and "the" are intended to include the plural forms including "at least one" or represent "and/or" unless the content clearly indicates otherwise. As used herein, the terminology "and/or" includes any and all combinations of one or more of the associated listed items. It should also be understood that when used in this disclosure, the terminologies "include" and/or "comprise" indicate the presence of the described features, regions, overall scenarios, steps, operations, elements, and/or components but do not exclude the presence or addition of one or more other features, regions, overall scenarios, steps, operations, elements, components, and/or combinations thereof.

Furthermore, relative terminologies, such as "lower" or "bottom" and "upper" or "top" may be used herein to describe the relationship between one element and another element, as shown in the drawings. It should be understood that relative terminologies are intended to encompass different orientations of the device in addition to the orientation shown in the drawings. For instance, if a device in one of the accompanying drawings is turned upside down, elements described as being on the "lower" side of other elements would then be oriented on the "upper" sides of the other elements. Thus, the exemplary terminology "lower" may include an orientation of being on the "lower" side and the "upper" side, depending on the particular orientation of the accompanying drawings. Similarly, if the device in one of the accompanying drawings is turned upside down, elements described as being "below" or "beneath" other elements would then be oriented "above" the other elements. Thus, the exemplary terminology "below" or "beneath" may encompass an orientation of being above and below.

Considering the particular amount of measurement and measurement-related errors discussed (i.e., the limitations of the measurement system), the terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by persons of ordinary skill in the art. It will be further understood that terminologies, such as those defined in commonly used dictionaries, should be interpreted as having a meaning that is consistent with their meaning in the context of the relevant art and the disclosure and will not be interpreted in an idealized or overly formal sense unless expressly so defined herein.

Exemplary embodiments are described herein with reference to the cross-sectional schematic views illustrating idealized embodiments. Therefore, variations of shapes resulting from the manufacturing technologies and/or tolerances, for instance, are to be expected. Therefore, the embodiments described herein should not be construed as being limited to the particular shapes of regions as illustrated herein but are to include deviations in shapes that result from manufacturing, for example. For instance, regions shown or described as being flat may typically have rough and/or non-linear features. Besides, the acute angle as shown may be round. Therefore, the regions shown in the drawings are schematic in nature, and their shapes are not intended to show the exact shape of the regions, and are not intended to limit the scope of the claims.

Figure 1:
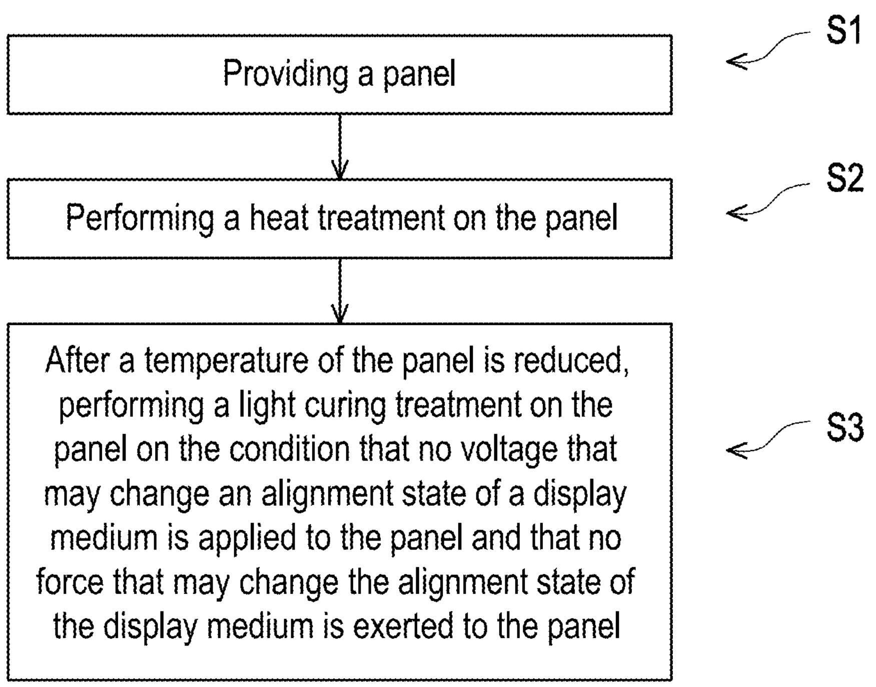
FIG. 1 is a flowchart of a manufacturing method of a display device according to an embodiment of the disclosure.
Figure 2A:
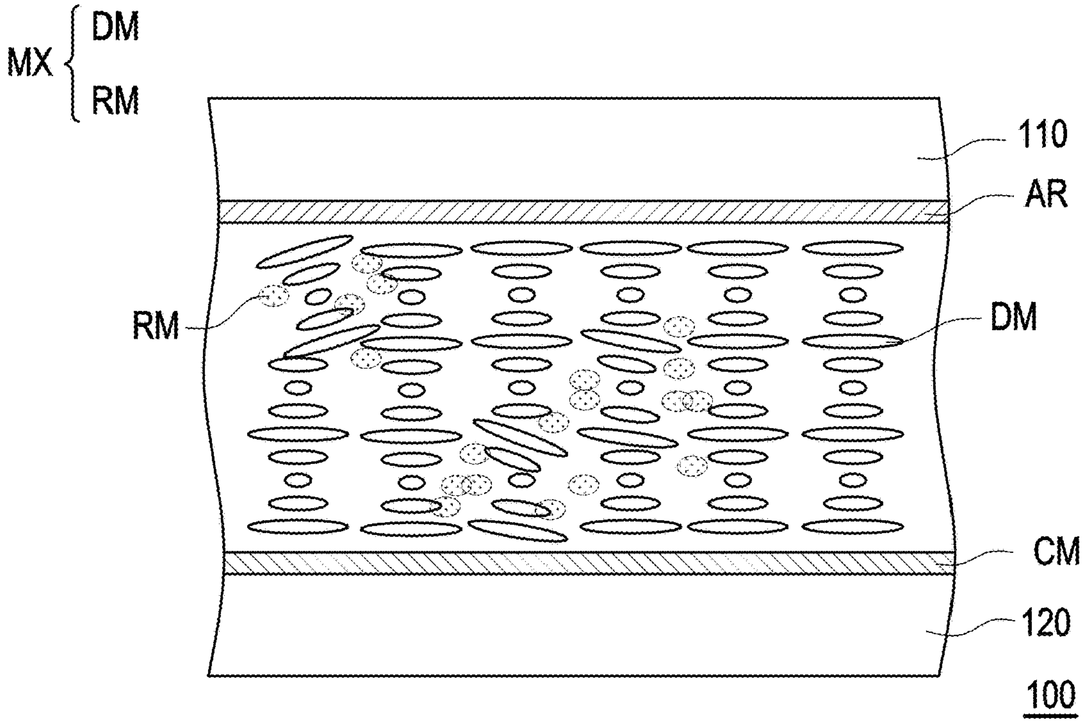
FIG. 2A to FIG. 2C are schematic cross-sectional views of steps in a manufacturing method of a display device according to an embodiment of the disclosure.
Figure 2B:
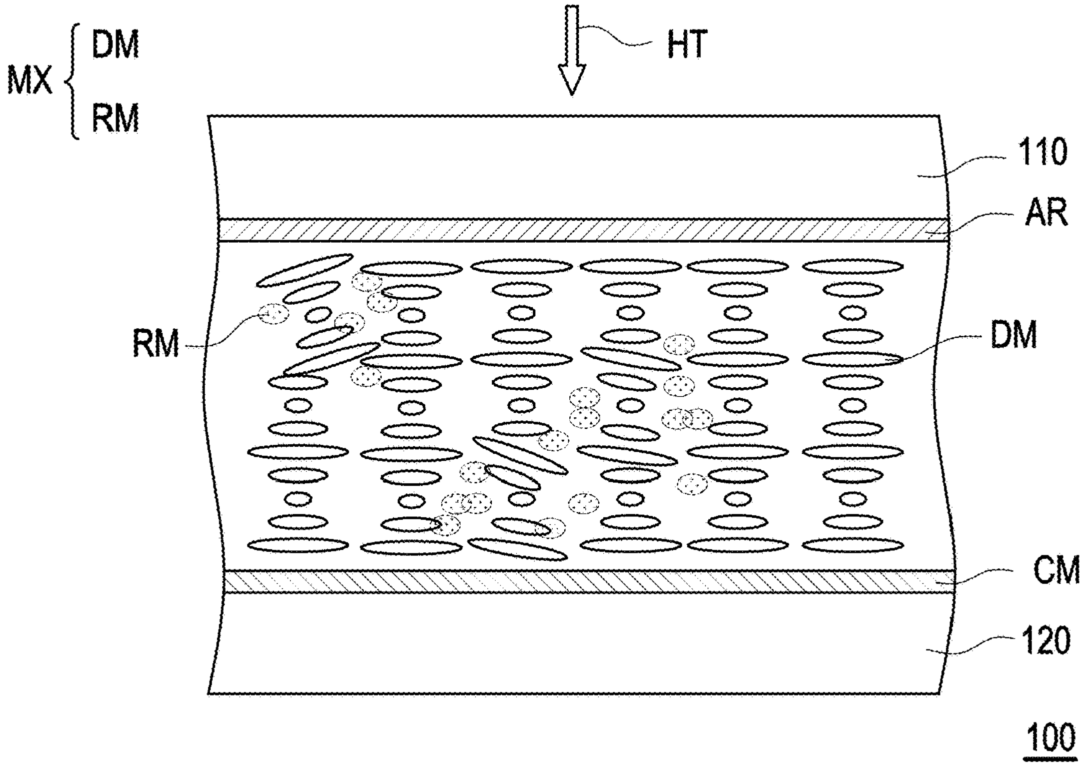
Figure 2C:
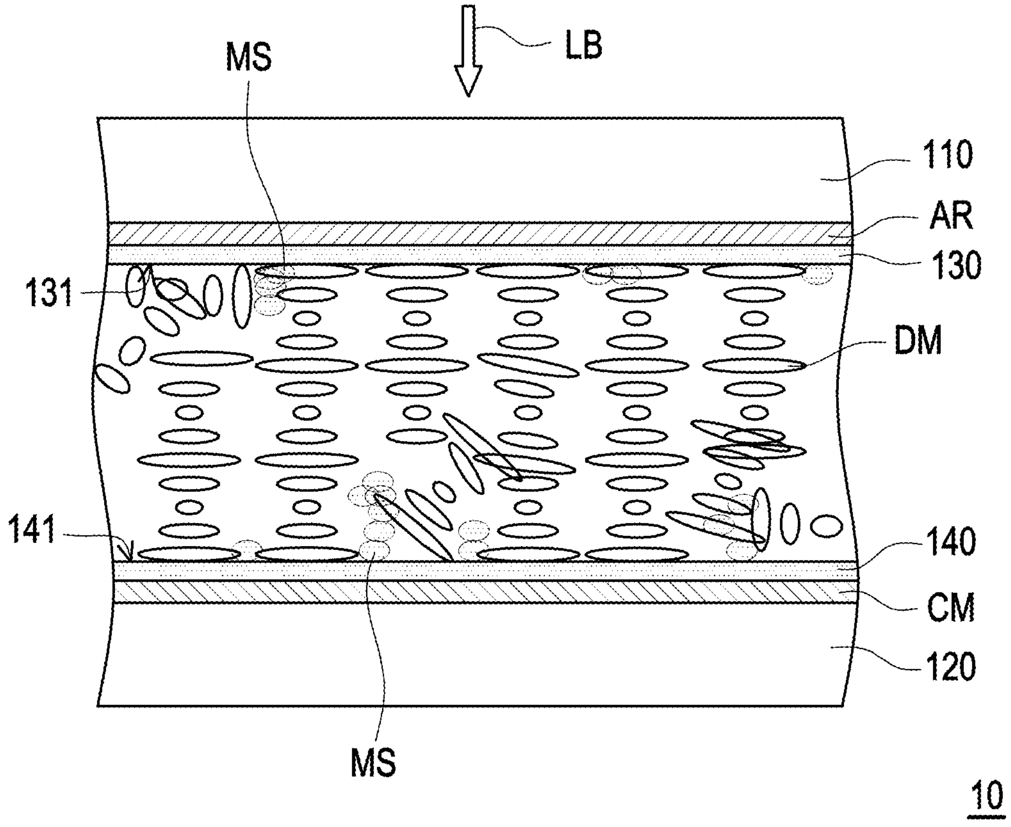

FIG. 1 is a flowchart of a manufacturing method of a display device according to an embodiment of the disclosure. FIG. 2A to FIG. 2C are schematic cross-sectional views of steps in a manufacturing method of a display device according to an embodiment of the disclosure. According to an embodiment, the manufacturing method of a display device 10 is exemplarily described hereinafter with reference to FIG. 1 and FIG. 2A to FIG. 2C.

In this embodiment, the manufacturing method of the display device 10 may include following steps. First, with reference to FIG. 1 and FIG. 2A, in step S1, a panel 100 is provided, and the panel 100 includes, for instance, a first substrate 110, a second substrate 120, and a display medium composition MX, wherein the display medium composition MX is located between the first substrate 110 and the second substrate 120, and the display medium composition MX may include a display medium DM and a reactive mesogen RM.

In some embodiments, the panel 100 may be formed by forming a pixel array layer AR on the first substrate 110 first. Specifically, the first substrate 110 may be provided. A material of the first substrate 110 may include glass, quartz, an organic polymer, or any other appropriate material. Next, the pixel array layer AR may be formed on the first substrate 110 by performing a semiconductor manufacturing process.

The pixel array layer AR at least includes a plurality of active elements (not shown), a plurality of pixel electrodes (not shown), a plurality of data lines (not shown), and a plurality of scan lines (not shown), wherein the active elements are, for instance, thin film transistors with sources, gates, and drains, the data lines may be electrically connected to the sources of the active elements, the scan lines may be electrically connected to the gates of the active elements, and the pixel electrodes may be electrically connected to the drains of the active elements, which should however not be construed as a limitation in the disclosure.

In some embodiments, the panel 100 may be further formed by forming a common electrode layer CM on the second substrate 120. A material of the second substrate 120 may be similar to the material of the first substrate 110, and details are not described again. In some embodiments, a color filter layer may be further formed on the second substrate 120 before the common electrode layer CM is formed, so that the display device 10 may achieve a full-color display effect.

The manufacturing process of the panel 100 may further include a step of preparing the display medium composition MX. For instance, the display medium DM may be mixed with the reactive mesogen RM, so that the display medium composition MX includes the display medium DM and the reactive mesogen RM. The display medium DM is, for instance, cholesteric liquid crystal.

The reactive mesogen RM is a reactive monomer capable of polymerization while a light curing treatment is performed. In this embodiment, the reactive mesogen RM may be selected from compounds listed in Table 1 below or a combination thereof, which should however not be construed as a limitation in the disclosure. In some embodiments, the reactive mesogen RM may have a non-linear structure, and the reactive mesogen RM may have a non-rigid structure. In some embodiments, the reactive mesogen RM may include an acrylate group and a phenyl group. In some embodiments, the reactive mesogen RM may include two or more phenyl groups, and the phenyl groups may be linked by a rotatable functional group, such as —O—C(═O)—, which should however not be construed as a limitation in the disclosure.

TABLE 1

| | |
|---|---|
| Reactive mesogen | 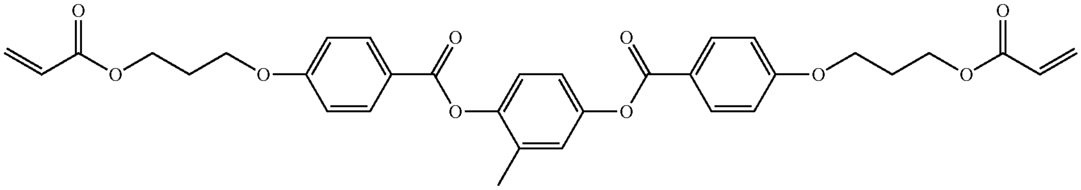 [SMILES: C=CC(=O)OCCCOc1ccc(C(=O)Oc2ccc(OC(=O)c3ccc(OCCCOC(=O)C=C)cc3)c(C)c2)cc1] |
| | 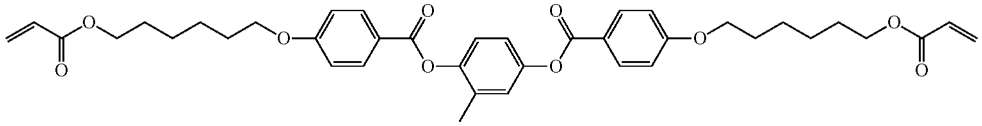 [SMILES: C=CC(=O)OCCCCCCOc1ccc(C(=O)Oc2ccc(OC(=O)c3ccc(OCCCCCCOC(=O)C=C)cc3)c(C)c2)cc1] |
| | 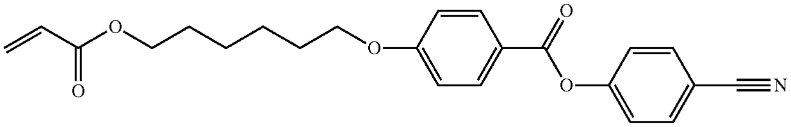 |
| | 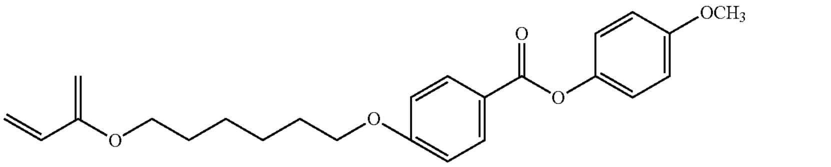 [SMILES: C=CC(=C)OCCCCCCOc1ccc(C(=O)Oc2ccc(OC)cc2)cc1] |
| | 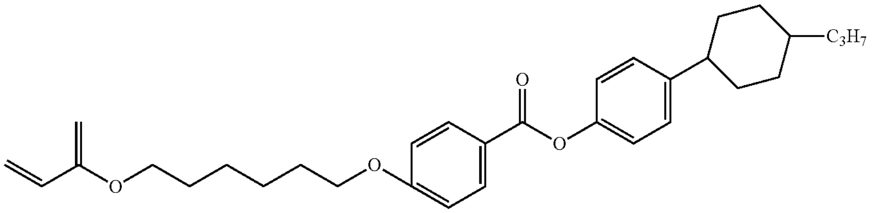 |
| | 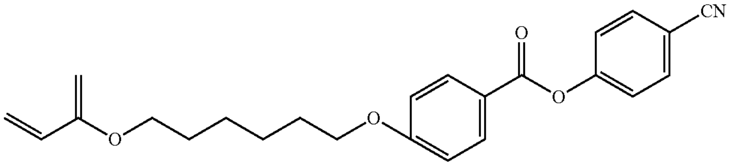 [SMILES: C=CC(=C)OCCCCCCOc1ccc(C(=O)Oc2ccc(C#N)cc2)cc1] |

In this embodiment, a weight percentage of the reactive mesogen RM in the display medium composition MX may range from 0.2 wt % to 2.0 wt %. Preferably, the weight percentage of the reactive mesogen RM in the display medium composition MX may range from 0.2 wt % to 1 wt %, e.g., 0.3 wt %, 0.5 wt %, or 0.8 wt %, which should however not be construed as a limitation in the disclosure. The weight percentage of the reactive mesogen RM may be determined by other parameters, such as a time period during which the light curing treatment is performed, energy consumed in the light curing treatment, and so on. In an embodiment, the weight percentage of the reactive mesogen RM in the display medium composition MX may range from 0.4 wt % to 1 wt %; thereby, the panel 100 (as shown in FIG. 2C) subsequently formed may have a high transmittance (including but not limited to: 86.83%) and low haze (including but not limited to: 18.8%).

Next, the first substrate 110 and the second substrate 120 may be assembled, and the display medium composition MX may fill between the pixel array layer AR of the first substrate 110 and the common electrode layer CM of the second substrate 120. For instance, a sealant (not shown) may be coated on the pixel array layer AR of the first substrate 110 or on the common electrode layer CM of the second substrate 120. After that, the display medium composition MX is dropped into the space enclosed by the pixel array layer AR or the common electrode layer CM and the sealant. Then, in a near-vacuum environment, one of the first substrate 110 and the second substrate 120 is made to approach the other of the first substrate 110 and the second substrate 120, so as to further adhere the first substrate 110 and the second substrate 120 through the sealant. As such, the display medium composition MX may be sealed between the pixel array layer AR of the first substrate 110 and the common electrode layer CM of the second substrate 120, and the fabrication of the panel 100 may be completed. In other words, the panel 100 may be formed by applying a one drop fill (ODF) method to fill the space in the panel 100 with the display medium composition MX, which should however not be construed as a limitation in the disclosure. In other embodiments, liquid crystal (LC) injection or other appropriate methods may also be applied to fill the space in the panel 100 with the display medium composition MX to form the panel 100.

Next, with reference to FIG. 1 and FIG. 2B, a heat treatment is performed on the panel 100 in step S2, wherein a temperature at which the heat treatment is performed is higher than a temperature at which the display medium DM is transformed into an isotropic liquid. For instance, the critical temperature for transforming the anisotropic display medium DM into the isotropic liquid is T° C. In this embodiment, the temperature at which the heat treatment is performed is preferably higher than or equal to T° C.+10° C. and more preferably higher than or equal to T° C.+20° C., which should however not be construed as a limitation in the disclosure. Specifically, in this embodiment, the panel 100 may be placed into an oven, and a temperature in the oven may be preset to be higher than the temperature of transforming the display medium DM into the isotropic liquid, e.g., from 100° C. to 150° C. (such as 120° C.), so that the display medium composition MX may absorb heat energy HT supplied by the oven and may be transformed into the isotropic liquid.

Next, with reference to FIG. 1 and FIG. 2C, in step S3, after the heat treatment is performed on the panel 100 and after a temperature of the panel 100 is reduced, the panel 100 undergoes a light curing treatment on the condition that no voltage that may change the alignment state of the display medium DM (e.g., cholesteric liquid crystal molecules) is applied to the panel 100 and that no force that may change the alignment state of the display medium DM (e.g., cholesteric liquid crystal molecules) is exerted to the panel 100. Specifically, in an embodiment, after the heat treatment is performed on the panel 100 and the temperature of the panel 100 is reduced to an appropriate temperature, the panel 100 undergoes a light curing treatment on the condition that no voltage (e.g., the voltage difference substantially equal to OV between the common electrode layer CM and the pixel electrode) is applied and that the force exerted to the panel 100 does not exceed 1 newton. In an embodiment, the appropriate temperature is not higher than T° C.-30° C. or even preferably lower than T° C.-35° C., where T° C. is a critical temperature at which the display medium DM transitions from anisotropic to isotropic liquid. In brief, the panel 100 undergoes the light curing treatment on the condition that a focal conic state of the panel 100 undergoing the heat treatment is not changed. Specifically, in this embodiment, the temperature of the panel 100 may be reduced to be 70° C. or lower at a speed not more than 6° C./min (e.g., preferably not more than 6° C./min and more preferably not more than 4° C./min), and the light curing treatment is then performed on the panel 100 by applying a light beam LB at a temperature (e.g., 23° C.) ranging from 70° C. to a room temperature (e.g., 20° C.) on the condition that no voltage (e.g., the voltage difference substantially equal to OV between the common electrode layer CM and the pixel electrode) is applied, that the force exerted to the panel 100 does not exceed 1 newton, and that the focal conic state of the display medium DM (e.g., cholesteric liquid crystal molecules) of the panel 100 undergoing the heat treatment remains unchanged. After the light curing treatment is completed, the reactive mesogen RM may be applied to form the first alignment layer 130 on the pixel array layer AR of the first substrate 110 and form the second alignment layer 140 on the common electrode layer CM of the second substrate 120, wherein micro-structures MS are deposited on a surface 131 of the first alignment layer 130 facing the display medium DM and a surface 141 of the second alignment layer 140 facing the display medium DM. Therefore, in the manufacturing method of the display device, the conventional printing process applied to form the alignment layer may be omitted.

The temperature reduction speed affects the grain size of the crystal phase of the display medium. When the temperature reduction speed is greater than 7° C./min (e.g., about 10° C./min), the domain size is too small, thus resulting in too much scattering in a focal conic state and leading to a high haze level. When the temperature reduction speed is not more than 6° C./min (e.g., preferably not more than 6° C./min, more preferably not more than 5° C./min, and much more preferably not more than 4° C./min), a medium grain size of the crystal phase of the display medium may be obtained. When the temperature reduction speed is about 0.5° C./min, a large grain size of the crystal phase of the display medium with a low haze level may be obtained. In an embodiment of the disclosure, the light curing treatment may be carried out when the grain size of the crystal phase of the display medium DM is a medium size.

The light beam LB applied in the light curing treatment may be non-polarizing light, such as non-polarizing UV light. In some embodiments, a wavelength of the light beam LB may range from 200 nm to 450 nm, e.g., 300 nm, 365 nm, or 420 nm. In some embodiments, the energy of the light beam LB may range from 80 $mW/cm^2$ to 200 $mW/cm^2$ and preferably range from 80 $mW/cm^2$ to 150 $mW/cm^2$, such as, 80 $mW/cm^2$, 100 $mW/cm^2$, or 150 $mW/cm^2$. In some embodiments, a time period during which the light curing treatment is performed ranges from 50 seconds to 400 seconds, such as 100 seconds, 200 seconds, or 300 seconds. In some embodiments, the total light curing energy consumed in the light curing treatment may range from 10 to 20 joule (J), e.g., 12 J, 15 J, or 18 J. The conditions on which the light curing treatment is performed are not limited to those described above and may be set appropriately according to actual demands.

FIG. 3 is a partial enlarged view of micro-structures of the display device 10 according to an embodiment of the disclosure With reference to FIG. 2C and FIG. 3, the display device 10 includes: the first substrate 110, the first alignment layer 130 disposed on the first substrate 110, the pixel array layer AR located between the first substrate 110 and the first alignment layer 130, the second substrate 120 disposed opposite to the first substrate 110, the second alignment layer 140 disposed on the second substrate 120, the common electrode layer CM located between the second substrate 120 and the second alignment layer 140, and the display medium DM located between the first alignment layer 130 and the second alignment layer 140. Here, the first alignment layer 130 and the second alignment layer 140 are located between the first substrate 110 and the second substrate 120, and the surface 131 of the first alignment layer 130 and the surface 141 of the second alignment layer 140 facing the display medium DM have topographies with irregular areas BK surrounded by the micro-structures MS. The display medium DM (e.g., cholesterol liquid crystal molecules) may display colors in a reflective state, and pitch stripes of the cholesterol liquid crystals may also be visible. The color in the reflective state may be controlled by adjusting pitch lengths of the cholesterol liquid crystal molecules, which may be achieved by adjusting the concentration of the added chiral agent.

In this embodiment, the micro-structures MS, the first alignment layer 130, and the second alignment layer 140 may be formed by polymerizing the reactive mesogen RM and depositing and absorbing the reactive mesogen RM onto the first substrate 110 and the second substrate 120. The micro-structures MS, the first alignment layer 130, and the second alignment layer 140 may include a polymer formed by polymerization of the reactive mesogen RM, such as an oligomer. The micro-structures MS may protrude from the surface 131 of the first alignment layer 130 and the surface 141 of the second alignment layer 140, and the micro-structures MS may jointly surround and define a plurality of topographies with irregular areas BK. Specifically, each micro-structure MS may include a plurality of particles formed by the polymerization reaction, the micro-structures MS substantially form a wall, and each of the topographies with the irregular areas BK is surrounded by the wall. The wall structure serves to keep the domain size of the liquid crystal molecules from changing, regardless of whether the liquid crystal molecules are switched to a planar state or a focal conic state.

In some embodiments, a thickness of the first alignment layer 130 and a thickness of the second alignment layer 140 are equal to or less than 300 Å, such as 150 Å, 220 Å, or 280 Å, and a capacitance of the first alignment layer 130 or a capacitance of the second alignment layer 140 is equal to or less than 10 μF, such as 5 μF or 8 μF, so as to further reduce the power consumption required for driving the display medium DM.

As shown in FIG. 3, the micro-structures MS may be shaped as irregular curves, such as irregular curves C1-C13, wherein lengths of the irregular curves C1-C13 may range from 10 μm to 900 μm, as shown in Table 2 below. For instance, in this embodiment, the irregular curves C1-C13 may surround and define a plurality of topographies with the irregular areas BK, and the irregular areas BK are not closed areas; the topographies with the irregular areas BK include a topography with irregular areas BK1 that are jointly surrounded by the irregular curves C1-C6 and another topography with irregular areas BK2 that may be jointly surrounded by the irregular curves C12 and C13, and the topographies with the irregular areas BK1 and BK2 have different shapes. In addition, in some embodiments, widths W of the irregular curves C1-C13 may range from 0.2 μm to 0.4 μm, e.g., 0.3 μm. In some embodiments, a diameter D of the topographies with the irregular areas BK may range from 20 μm to 700 μm, e.g., 50 μm, 200 μm, or 500 μm.

TABLE 2

| Irregular Curve | Length (μm) |
|---|---|
| C1 | 309.586 |
| C2 | 103.013 |
| C3 | 102.625 |
| C4 | 96.823 |
| C5 | 499.783 |
| C6 | 175.36 |
| C7 | 28.413 |
| C8 | 166.337 |
| C9 | 37.162 |
| C10 | 29.358 |
| C11 | 13.324 |
| C12 | 222.439 |
| C13 | 720.676 |

FIG. 4 is a particle size analysis diagram of the micro-structures MS according to an embodiment of the disclosure. It may be learned from FIG. 4 that the particle size of the reactive mesogen RM after polymerization is less than 1.0 μm and mostly ranges from 0.2 μm to 0.4 μm.

FIG. 5A is a micrograph of the display device 10 in which the display medium DM is in a homeotropic state according to an embodiment of the disclosure. FIG. 5B is a micrograph of the display device 10 in which the display medium DM is in a planar state (or referred to as a reflective state) according to an embodiment of the disclosure. In FIG. 5B, the color presented in the reflective state of the display medium DM (e.g., cholesteric liquid crystal) is clearly visible, and the characteristics of the display medium DM (e.g., cholesteric liquid crystal) in the reflective state may include a recognizable image of a liquid crystal pitch.

FIG. 5C is an image obtained by overlapping FIG. 5A and FIG. 5B. It may be learned from FIG. 5A that the reactive mesogen RM, which undergoes the light curing treatment, produces white polymers, which are deposited to form the micro-structure MS. It may be learned from FIG. 5B and FIG. 5C that the micro-structures MS formed by the polymerization and deposition of the reactive mesogen RM drive the display medium RM in the planar state to be arranged as blocks in a swirl manner (as shown by numbers 1, 2, 5-10, and 12-13) in the drawings, and these micro-structures MS also affect the crystal phase of the display medium RM in the planar state and the focal conic state.

FIG. 5D is a micrograph of the display device 10 in which the display medium DM is in a focal conic state according to an embodiment of the disclosure. FIG. 5E is a schematic view of arrangement in the display device 10 in which the display medium DM is in a focal conic state according to an embodiment of the disclosure. It may be learned from FIG. 5D that traces of aggregation of the reactive mesogen may limit the alignment of the display medium (e.g., arrangement of the LC molecules), thereby leading to a rather transparent state. It may be learned from FIG. 5E that the display medium DM in the focal conic state is arranged in a fan shaped-smectic manner and appears to be transparent.

In addition, a response time of the display medium of the display device 10 in different states is measured, and the measured results are listed in Table 3 below. It may be observed from Table 3 that, compared with Comparative Example 1, where the alignment layer is formed without applying any reactive mesogen, Embodiment 1 provided herein discloses the apparent reduction of the response time for the display medium to convert from the homeotropic state to the planar state, and the response time from the homeotropic state to the planar state and the response time from the planar state to the homeotropic state are merely 17.88 ms, which may satisfy the active driving requirement for the sum of the response time from the homeotropic state to the planar state and from the planar state to the homeotropic state to be less than 42 ms. In Embodiment 2, the weight percentage of the reactive mesogen is reduced, which may also satisfy the active driving requirement for the sum of the response time from the homeotropic state to the planar state and from the planar state to the homeotropic state to be less than 42 ms. More preferably, Embodiments 1 and 2 may satisfy the active driving requirement for the sum of the response time from the homeotropic state to the planar state and from the planar state to the homeotropic state to be less than 20 ms.

TABLE 3

| | | Embodiment 1 | Embodiment 2 | Comparative Example 1 |
|---|---|---|---|---|
| Display Medium | | Liquid crystal sample 1 | Liquid crystal sample 1 | Liquid crystal sample 1 |
| Reactive mesogen (wt %) | | 1.8 | 0.3 | 0 |
| Response Time (ms) | Planar State →Homotropic State | 3.9 | 4.25 | 3.7 |
| | Homotropic State → Planar State | 13.98 | 12.58 | 47.55 |

It should be noted that reference numbers of the devices and a part of contents of the previous embodiments are also used in the following embodiments, where the same reference numbers denote the same or like devices, and descriptions of the same technical contents are omitted. The previous embodiments may be referred for descriptions of the omitted parts, and detailed descriptions thereof are not repeated in the following embodiments.

FIG. 6A to FIG. 6C are schematic cross-sectional views of steps in a manufacturing method of a display device according to another embodiment of the disclosure. The manufacturing method of the display device 10A in FIG. 6A to FIG. 6C is the same as the manufacturing method of the display device 10 provided above, and various process conditions/process parameters of the manufacturing method of the display device 10A in FIG. 6A to FIG. 6C may be derived from the previous descriptions and thus will not be repeated here. The difference between the display devices 10A and 10 lies in that the structure of a panel 100A configured to form the display device 10A is different from the structure of the panel 100 configured to form the display device 10, and the structure of the resultant display device 10A is also different from the structure of the display device 10 described above.

With reference to FIG. 6A, first, in step S1, a panel 100A is provided. In this embodiment, the panel 100A configured to form the display device 10A further includes a plurality of first protrusions 150 which are disposed on the second substrate 120 and separated from each other. In this embodiment, the first protrusions 150 may be optionally formed on the common electrode layer CM, and the common electrode layer CM is located between the first protrusions 150 and the second substrate 120, which should however not be construed as a limitation in the disclosure. In another embodiment not shown in the drawings, the first protrusions 150 may also be formed on the second substrate 120, and the first protrusions 150 may also be located between the common electrode layer CM and the second substrate 120. For instance, in this embodiment, the first protrusions 150 may be formed by performing an inkjet printing process and a light curing process, which should however not be construed as a limitation in the disclosure. In other embodiments, the first protrusions 150 may also be formed by performing a steel mold pressing process, a photolithography process, or another method. A material of the first protrusions 150 may include an organic polymer or an inorganic material.

With reference to FIG. 6B to FIG. 6C, similar to the embodiment illustrated in FIG. 2A to FIG. 2C, the above-mentioned steps S2 and S3 (which may be referred to as those shown in FIG. 1) may be completed in sequence. Specifically, in step S2, the panel 100A undergoes the heat treatment, where the temperature at which the heat treatment is performed is higher than the temperature at which the display medium DM is transformed to an isotropic liquid. For instance, the critical temperature at which the display medium DM is transformed from an anisotropic liquid to an isotropic liquid is T° C.; next, in step S3, after the panel 100A has undergone the heat treatment and is cooled down, the panel 100A undergoes a light curing treatment on the condition that no voltage that may change the alignment state of the display medium DM (e.g., cholesteric liquid crystal molecules) is applied to the panel 100A and that no force that may change the alignment state of the display medium DM (e.g., cholesteric liquid crystal molecules) is exerted to the panel 100A. After the light curing treatment is completed, the reactive mesogen RM may form the first alignment layer 130 on the first substrate 110 and form the second alignment layer 140 on the second substrate 120 and the first protrusions 150.

As shown in FIG. 6C, the first alignment layer 130 and the second alignment layer 140 are formed on the first substrate 110 and the second substrate 120, respectively, and the surface 131 of the first alignment layer 130 and the surface 141 of the second alignment layer 140 facing the display medium DM have topographies with the irregular areas BK surrounded by a plurality of micro-structures MS (as shown in FIG. 3).

With reference to FIG. 6C, different from the embodiment depicted in FIG. 2C, the second alignment layer 140 is further disposed on the first protrusions 150. A portion of the micro-structures MS of the second alignment layer 140 is located on the first protrusions 150. The display medium DM (e.g., cholesteric liquid crystal) in a planar state is aligned along the topographies of the first protrusions 150 and present various reflection angles. Thereby, a reflectivity of the display device 10A in a normal viewing direction may be enhanced, and a reflection viewing angle of the display device 10A may be broadened.

Specifically, in an embodiment, the display medium DM includes cholesteric liquid crystal molecules SACLC-1, SACLC-2, and SACLC-3 which present different reflection surface angles. The cholesteric liquid crystal molecules SACLC-1 are located near top surfaces of the first protrusions 150, the cholesteric liquid crystal molecules SACLC-2 are located between the first protrusions 150, and the cholesteric liquid crystal molecules SACLC-3 are located the edges of the first protrusions 150. The reflection surface of the cholesteric liquid crystal molecules SACLC-1 in the planar state is less inclined than the second substrate 120, the reflection surface of the cholesteric liquid crystal molecules SACLC-2 in the planar state is moderately inclined as compared to the second substrate 120, and the reflection surface of the cholesteric liquid crystal molecules SACLC-3 in the planar state is more inclined than the second substrate 120. The inclination degrees of the reflection surfaces of the cholesteric liquid crystal molecules SACLC-1 and SACLC-3 as compared to the inclination degree of the second substrate 120 are subject to the topographies of the first protrusions 150. Here, the reflection surface of the cholesteric liquid crystal molecules SACLC-1 with a relatively small inclination degree is conducive to an increase in the reflectivity of the display device 10A in the normal viewing direction, while the reflection surface of the cholesteric liquid crystal molecules SACLC-3 with a relatively large inclination degree enables the reflection viewing angle of the display device 10A to be broadened.

FIG. 7 illustrates a relationship between a wavelength of incident light and a reflectivity of scattering reflection of a display device 10 provided in an embodiment of the disclosure and a relationship between the wavelength of the incident light and a reflectivity of scattering reflection of a display device 10A according to another embodiment of the disclosure. FIG. 8 illustrates a relationship between a wavelength of incident light and a reflectivity of specular reflection and scattering reflection of a display device 10 provided in an embodiment of the disclosure and a relationship between the wavelength of the incident light and a reflectivity of specular reflection and scattering reflection of a display device 10A according to another embodiment of the disclosure.

From the data in FIG. 7 and FIG. 8, it may be learned that as compared to the display device 10 in FIG. 2C, the reflectivity of scattering reflection and the reflectivity of specular reflection and scattering reflection of the display device 10A in FIG. 6C are both increased through the disposition of the first protrusions 150. Here, the reflectivity of scattering reflection is increased by approximately 26%, and the reflectivity of specular reflection and scattering reflection is increased by approximately 23%.

With reference to FIG. 6C, in an embodiment, the micro-structures MS on the surface 141 of the second alignment layer 140 include a plurality of first micro-structures MS1 and a plurality of second micro-structures MS2. The first micro-structures MS1 are disposed on the first protrusions 150, and the second micro-structures MS2 are disposed between the first protrusions 150. Each of the first protrusions 150 has a plurality of surfaces 150*s*. In an embodiment, an included angle θ may exist between the surface 150*s* of one of the first protrusions 150 and the second substrate 120, and the included angle θ is greater than or equal to 15 degrees and less than or equal to 60 degrees. More preferably, the included angle θ falls within a range from 30 degrees to 55 degrees. In an embodiment, the surfaces 150*s* of the first protrusions 150 are, for instance, a plurality of protruding arc surfaces, and the first micro-structures MS1 are disposed on the protruding arc surfaces. The included angle θ between the surface 150*s* of the one of the first protrusions 150 and the second substrate 120 may refer to an included angle between a plane tangent to the arc surface and the second substrate 120, which should however not be construed as a limitation in the disclosure. In other embodiments, the surface 150*s* may also be in a form other than the arc surface. For instance, in another embodiment not shown in the drawings, the surface 150*s* may also include a plurality of sub-inclined planes, and included angles between the sub-inclined planes and the second substrate 120 are different.

FIG. 9 is a schematic top view of a pixel electrode and a plurality of first protrusions of a display device according to another embodiment of the disclosure. With reference to FIG. 6C and FIG. 9, the pixel array layer AR includes a pixel electrode PE disposed on one of the first substrate 110 and the second substrate 120, one of the first protrusions 150 has a protrusion width W150 in a direction x parallel to the second substrate 120, the pixel electrode PE has a pixel width WPE in the direction x, and the protrusion width W150 is greater than or equal to 2 μm and less than or equal to one quarter of the pixel width WPE. For instance, in an embodiment, the protrusion width W150 may be greater than or equal to 2 μm and less than or equal to 60 μm, which should however not be construed as a limitation in the disclosure.

With reference to FIG. 9, in an embodiment, there is a distance S between the adjacent first protrusions 150 in the direction x parallel to the second substrate 120, one of the first protrusions 150 has the protrusion width W150 in the direction x, and the distance S is substantially equal to twice the protrusion width W150, which should however not be construed as a limitation in the disclosure. With reference to FIG. 6C and FIG. 9, in an embodiment, an orthogonal projection of the first protrusions 150 on the second substrate 120 may be circular, which should however not be construed as a limitation in the disclosure. In other embodiments, the orthogonal projection of the first protrusions 150 on the second substrate 120 may also be elliptical or in another shape.

With reference to FIG. 6C, in an embodiment, the first protrusions 150 have a protrusion thickness T150 in a direction z perpendicular to the second substrate 120, the protrusion thickness T150 is preferably less than 2 μm, so that a driving voltage of the display device 10A may not be excessively high, which should however not be construed as a limitation in the disclosure. In an embodiment, a pitch P in a direction x of the first protrusions 150 is, for instance, 130 μm, which should however not be construed as a limitation in the disclosure.

FIG. 10 is a schematic top view of a plurality of first protrusions according to another embodiment of the disclosure. With reference to FIG. 10, the direction x and the direction y are parallel to the second substrate 120 (as shown in FIG. 6C) and are staggered. In an embodiment, the first protrusions 150 may be arranged in a plurality of rows R, the first protrusions 150 in each row R are arranged along the direction x, and the first protrusions 150 in two adjacent rows R are staggered in the direction y.

FIG. 11 is a schematic top view of a plurality of first protrusions according to yet another embodiment of the disclosure. With reference to FIG. 11, in an embodiment, the first protrusions 150 may include a plurality of first protrusions 151 and a plurality of first protrusions 152, where the width W151 of the first protrusions 151 is greater than the width W152 of the first protrusions 152. In an embodiment, the first protrusions 151 and 152 with different widths W151 and W152 may be alternately arranged in the direction x and the direction y.

FIG. 12 is a schematic top view of a plurality of first protrusions according to still another embodiment of the disclosure. With reference to FIG. 12, in an embodiment, the first protrusions 150 may be divided into a plurality of first protrusion groups G150, each of the first protrusion groups G150 includes a plurality of adjacent first protrusions 151 with a relatively large width W151. In the same row R, the first protrusion groups G150 and a plurality of first protrusions 152 with a relatively small width W152 are alternately arranged in the direction x.

FIG. 13 is a schematic top view of a pixel electrode and a plurality of first protrusions of a display device according to an embodiment of the disclosure. With reference to FIG. 13, in an embodiment, a plurality of first protrusions 151 with a relatively large width W151 may be arranged in one row R, a plurality of first protrusions 152 with a relatively small width W152 may be arranged in another row R, and the first protrusions 151 with the relatively large width W151 and the first protrusions 152 with the relatively small width W152 may be aligned in the direction y.

FIG. 14 is a schematic top view of a pixel electrode and a plurality of first protrusions of a display device according to another embodiment of the disclosure. With reference to FIG. 14, in an embodiment, a plurality of first protrusions 151 with a relatively large width W151 may be arranged in one row R, a plurality of first protrusions 152 with a relatively small width W152 may be arranged in another row R, and the first protrusions 151 with the relatively large width W151 and the first protrusions 152 with the relatively small width W152 may be staggered in the direction y.

FIG. 15 is a schematic top view of a plurality of first protrusions according to yet another embodiment of the disclosure. With reference to FIG. 15, in an embodiment, a plurality of first protrusions 151 with a relatively large width W151 and a plurality of first protrusions 152 with a relatively small width W152 are arranged in a row R, the first protrusions 151 and the first protrusions 152 in the same row R may be alternately arranged in the direction x, the first protrusions 151 in two adjacent rows R may be aligned in the direction y, and the first protrusions 152 in two adjacent rows R may also be aligned in the direction y.

FIG. 16 is a schematic top view of a plurality of first protrusions according to still another embodiment of the disclosure. With reference to FIG. 16, in an embodiment, a plurality of first protrusions 151 with a relatively large width W151 and a plurality of first protrusions 152 with a relatively small width W152 are alternately arranged in both the x and y directions.

FIG. 17 is a schematic cross-sectional view of a display device 10B according to yet another embodiment of the disclosure. The illustration of the display medium DM is omitted in FIG. 17. The display device 10B in FIG. 17 is similar to the display device 10A in FIG. 6C, while the difference therebetween lies in that the display device 10B in FIG. 17 further includes a plurality of second protrusions 160 disposed on the first substrate 110. With reference to FIG. 17, in this embodiment, the second protrusions 160 are disposed on the first substrate 110 and are separated from each other, where the first alignment layer 130 is disposed on the first substrate 110 and the second protrusions 160. In this embodiment, the second protrusions 160 may be optionally disposed on the pixel array layer AR, and the pixel array layer AR may be located between the first substrate 110 and the second protrusions 160, which should however not be construed as a limitation in the disclosure. In another embodiment not shown in the drawings, the second protrusions 160 may also be disposed on the first substrate 110 and located between the first substrate 110 and the pixel array layer AR.

In the embodiment depicted in FIG. 17, the first protrusions 150 and the second protrusions 160 are disposed on the first substrate 110 and the second substrate 120, respectively. However, this should not be construed as a limitation in the disclosure, and in another embodiment not shown in the drawings, the first protrusions 150 in FIG. 17 may also be omitted, and no first protrusions 150 are disposed on the second substrate 120, while the second protrusions 160 are disposed on the first substrate 110.

FIG. 18 is a schematic cross-sectional view of a display device 10C according to still another embodiment of the disclosure. The display device 10C in FIG. 18 is similar to the display device 10B in FIG. 17, while the difference therebetween lies in that the first protrusions 150 and the second protrusions 160 are overlapped in the display device 10B depicted in FIG. 17; by contrast, in the display device 10C depicted in FIG. 18, the first protrusions 150 may be staggered with the second protrusions 160.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a first substrate;

a first alignment layer, disposed on the first substrate;

a second substrate, disposed opposite to the first substrate;

a plurality of first protrusions, disposed on the second substrate and separated from each other;

a second alignment layer, disposed on the second substrate and the first protrusions, wherein the first alignment layer and the second alignment layer are located between the first substrate and the second substrate; and a display medium, located between the first alignment layer and the second alignment layer, wherein a surface of the first alignment layer and a surface of the second alignment layer facing the display medium have topographies with a plurality of different irregular areas surrounded by a plurality of micro-structures, the micro-structures substantially form a wall by jointing with each other, each of the topographies with the different irregular areas is surrounded by the wall, the micro-structures comprise a plurality of first micro-structures, and the first micro-structures are disposed on the first protrusions.

2. The display device according to claim 1, wherein the micro-structures further comprise a plurality of second micro-structures, and the second micro-structures are disposed between the first protrusions.

3. The display device according to claim 2, wherein the first protrusions have a plurality of protruding arc surfaces, and the first micro-structures are disposed on the protruding arc surfaces.

4. The display device according to claim 1, further comprising:

a pixel electrode, disposed on one of the first substrate and the second substrate, wherein one of the first protrusions has a protrusion width in a direction parallel to the second substrate, the pixel electrode has a pixel width in the direction, and the protrusion width is greater than or equal to 2 μm and less than or equal to one quarter of the pixel width.

5. The display device according to claim 1, wherein a distance exists between adjacent first protrusions of the first protrusions in a direction parallel to the second substrate, one of the first protrusions has a protrusion width in the direction, and the distance is substantially equal to twice the protrusion width.

6. The display device according to claim 1, wherein one of the first protrusions has a protrusion thickness in a direction perpendicular to the second substrate, and the protrusion thickness is less than 2 μm.

7. The display device according to claim 1, further comprising:

a plurality of second protrusions, disposed on the first substrate and separated from each other, wherein the first alignment layer is disposed on the first substrate and the second protrusions.

8. The display device according to claim 7, wherein the first protrusions are staggered with the second protrusions.

9. The display device according to claim 1, wherein an included angle exists between a surface of one of the first protrusions and the second substrate, and the included angle is greater than or equal to 15 degrees and less than or equal to 60 degrees.

* * * * *